United States Patent
Jacoby et al.

(10) Patent No.: US 8,941,672 B1
(45) Date of Patent: Jan. 27, 2015

(54) METHOD FOR IDENTIFYING A DISPLAY WHEN A GPU CONNECTED TO THE DISPLAY IS POWERED DOWN

(75) Inventors: Rambod Jacoby, San Jose, CA (US); David Wyatt, San Jose, CA (US); Yu Qing Cheng, San Jose, CA (US); Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1784 days.

(21) Appl. No.: 12/030,800

(22) Filed: Feb. 13, 2008

(51) Int. Cl.
    *G06F 13/14* (2006.01)

(52) U.S. Cl.
    USPC ............ 345/520; 345/418; 345/502; 713/300

(58) Field of Classification Search
    USPC .......... 345/501–522, 699, 156, 418; 713/300, 713/324
    See application file for complete search history.

(56) References Cited

U.S. PATENT DOCUMENTS

| | | | |
|---|---|---|---|
| 6,697,033 B1* | 2/2004 | Leung et al. | 345/5 |
| 6,850,240 B1* | 2/2005 | Jones, Jr. | 345/503 |
| 7,053,864 B1* | 5/2006 | Lee | 345/3.4 |
| 7,058,829 B2* | 6/2006 | Hamilton | 713/320 |
| 7,126,608 B2* | 10/2006 | Alben et al. | 345/501 |
| 7,702,938 B2* | 4/2010 | Ha | 713/323 |
| 2006/0082569 A1* | 4/2006 | Noorbakhsh et al. | 345/211 |
| 2007/0008428 A1* | 1/2007 | Hong | 348/500 |
| 2007/0076006 A1* | 4/2007 | Knepper et al. | 345/520 |
| 2009/0153467 A1* | 6/2009 | Crovella | 345/156 |

* cited by examiner

*Primary Examiner* — Maurice L McDowell, Jr.
(74) *Attorney, Agent, or Firm* — Patterson & Sheridan, LLP (57) ABSTRACT

Embodiments of the present disclosure provide techniques for identifying a display when a graphics processing unit (GPU) connected to the display via a display control bus is in a low power state. By providing a separate microcontroller with a parallel connection to the display control bus, the microcontroller may detect the presence of a display device even when the GPU is in the low power state. In response to detecting the display device, the microcontroller may notify a motherboard chipset (e.g., via an interrupt) prompting the motherboard chipset to initiate a sequence to bring the GPU out of the low power state.

20 Claims, 6 Drawing Sheets

METHOD FOR IDENTIFYING A DISPLAY WHEN A GPU CONNECTED TO THE DISPLAY IS POWERED DOWN

TECHNICAL FIELD

Certain embodiments of the present disclosure generally relate to graphics processing.

BACKGROUND

Desktop and portable computer systems often include graphics processing capabilities, for example, with a graphics processing unit (GPU) built into a motherboard chipset. Often, however, such systems allow for upgrades through the addition of a graphics card that typically has a GPU with more powerful processing capabilities than the motherboard GPU.

Drivers are available to offload graphics processing tasks to the graphics card GPU, when present. In a typical system, as long as the graphics card is installed, it will be powered on and functioning even in the absence of a graphics processing load that would gain significant benefit by offloading to the graphics card for processing.

Unfortunately, due to the high number of gates and high speed operation of complex GPUs, graphics cards consume a significant amount of power and generate a significant amount of heat. Further, to help manage the heat, graphics cards often have thermal solutions (e.g., relatively powerful fans) that generate a significant amount of noise.

While simply powering off a graphics card would reduce power consumption, heat and noise generation, relative long boot processes required on power up (e.g., when a complex graphics processing load is present) make this solution unattractive. Further, certain functionality of the graphics card (such as display detection) might also be lost if the entire card was powered down.

Therefore, solutions are needed that would help reduce the significant amount of power consumption, heat, and/or noise generated by graphics cards without unreasonable sacrifices in performance and/or functionality.

SUMMARY

Embodiments provide a technique and apparatus for detecting a display device.

One embodiment provides a method for detecting a change in display device state. The method generally includes polling an interface of a graphics card to detect a change in a display device connected to the interface, wherein the polling is performed when a graphics processing unit (GPU) of the display device is in a low power state and, upon detecting the change in display device connected to the interface, notifying a motherboard on which the graphics card is connected.

One embodiment provides an apparatus for detecting a change in display device state. The apparatus generally includes an interface for communicating with a display device connected to a graphics card to detect a change in a display device connected to the graphics card and change detection logic. The change detection logic is generally configured for polling, via the interface, to detect a change in a display device connected to the graphics card when a graphics processing unit (GPU) of the display device is in a low power state and for notifying a motherboard on which the graphics card is connected upon detecting a change in a display device connected to the graphics card.

One embodiment provides a graphics card generally including a graphics processing unit (GPU) capable of being dynamically placed in a low power state and change detection logic. The change detection logic is generally configured for polling a display interface to detect a change in a display device connected to the graphics card when the GPU is in the low power state and for notifying a motherboard on which the graphics card is connected upon detecting a change in a display device connected to the graphics card.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure provide techniques for identifying a display when a graphics processing unit (GPU) connected to the display via a display control bus is in a low power state. By providing a separate microcontroller with a parallel connection to the display control bus, the microcontroller may detect the presence of a display device even when the GPU is in the low power state. In response to detecting the display device, the microcontroller may notify a motherboard chipset (e.g., via an interrupt) prompting the motherboard chipset to initiate a sequence to bring the GPU out of the low power state.

The techniques provided in the present disclosure may be utilized in a variety of systems that utilize graphics card including desktop computers, portable computers, gaming systems, and the like.

AN EXAMPLE SYSTEM

Figure 1:
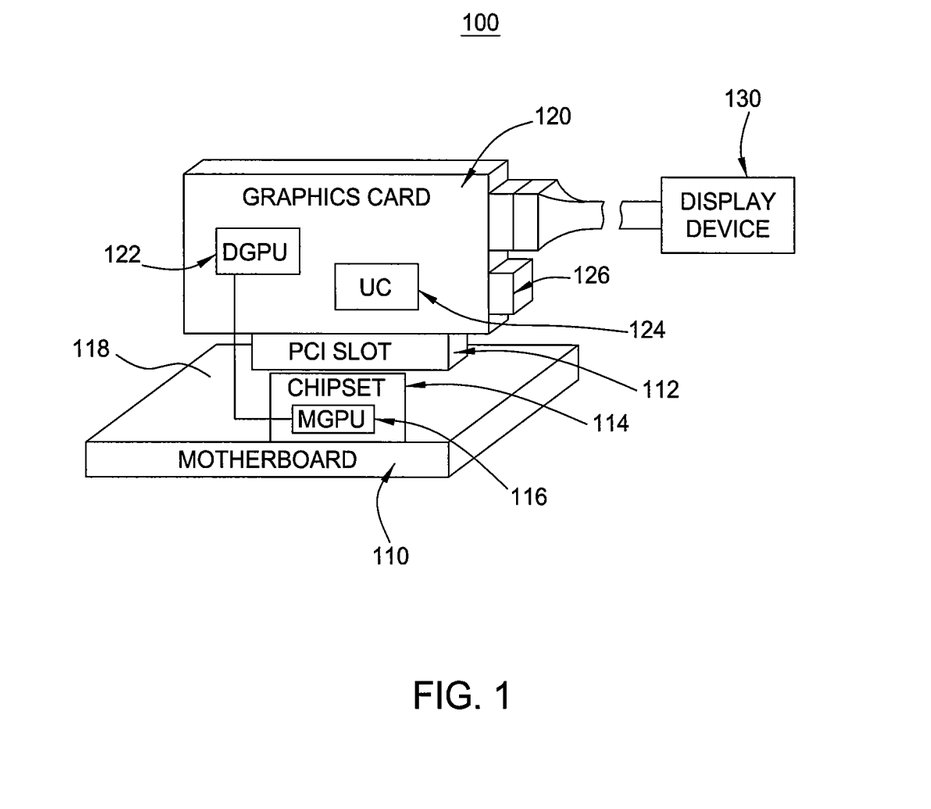
FIG. 1 illustrates an example system in accordance with certain embodiments of the present disclosure.

FIG. 1 illustrates an example system 100 in which embodiments of the present disclosure may be utilized. The system 100 generally includes a motherboard 110 with a card slot 112 to receive a graphics card 120. For example, the card slot 112 may be a PCI-Express card slot allowing a PCI-Express compatible graphics card to be mounted on the motherboard.

The motherboard may include a chipset 114 including, for example, a motherboard GPU (mGPU) 116. The chipset 114 may also include a central processing unit (CPU) which may be separate from an mGPU or the mGPU may be integrated in a single package with the CPU.

As illustrated, the graphics card 120 may include a discrete GPU 122. The dGPU 122 may be designed with substantially more graphics processing power than the mGPU 116, often serving to upgrade the overall graphics processing capabilities of the system 100. Scene data requiring intensive graphics processing, such as realistic 3-D graphics in video games, may be offloaded to the dGPU 122 for processing.

The motherboard chipset 114 may offload graphics data to the dGPU 122 via a bus 118, which may be any suitable type bus. For some embodiments, the bus 118 may be a PCI-Express bus. Accordingly, the card slot 112 may be a PCI-Express card slot and the graphics card 120 may be PCI-Express compatible.

As described above, due to the complexity and speed of operation, the dGPU 122 may consume a substantial amount of power and generate a substantial amount of heat. Often the graphics card 120 will include some type of thermal solution including, for example, relatively powerful fans allowing the dGPU 122 to be cooled by convection. These fans may contribute significantly to the overall noise generated by system 100.

In some cases, it may be desirable to reduce the overall power consumption and noise generated by the graphics card 120 by powering down the dGPU 122 on occasion. For example, the dGPU may be powered down when the system 100 is running applications where the graphics processing capabilities of the mGPU 116 are sufficient.

For some embodiments, the graphics card 120 may include logic for coordinating power down of the dGPU 120 and/or corresponding thermal solutions when the graphics card 120 is placed in a low power state. For example, the graphic card 120 may include a microcontroller 124 (or other type of processor) that coordinates powering down components to place the graphics card 120 in a low power state. The microcontroller 124 may, for example, control one or more regulators that supply voltage to the dGPU 122 and/or thermal solutions.

Identifying a Display when the GPU is Powered Down

Even when the graphics card 120 is powered down, however, it may be desirable to retain certain functionality that is conventionally only available when the dGPU 122 is powered on. For example, it is often desirable to automatically detect when a display device 130 is plugged into a display interface 126 of the graphics card 120. In order to provide such functionality, for some embodiments, the microcontroller 124 may remain powered up even while the dGPU 122 is powered off.

Figure 2:
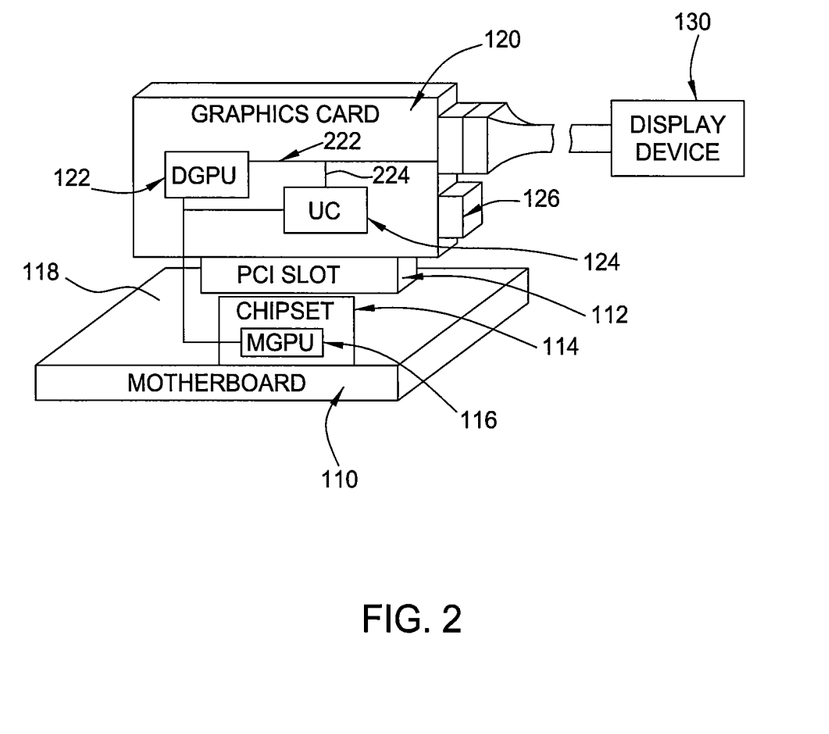
FIG. 2 illustrates an example system in accordance with certain embodiments of the present disclosure.

As illustrated in FIG. 2, display detection may be accomplished via a bus interface between the dGPU and the display interface 126. The bus interface may be any suitable interface, for example, including a display-data channel (DDC) interface 222 as shown. When the dGPU 122 is powered on, the dGPU 122 may monitor the DDC 222 (e.g., via polling) to detect the presence of a display device.

While a DDC interface is depicted, the techniques described herein may be applied using a variety of different display interfaces. For example, similar techniques may be applied to detect the presence of a display via some type of digital interface, such as digital video interface (DVI) connection, a high definition multimedia interface (HDMI) HDMI connection, or any other type of display connection. Some connections, such as DVI and HDMI connections, may utilize a hot plug detect (HPD) signal that may help identify (and/or detect) a display. Other types of digital interfaces, such as Display Port AUX channel signals may also be utilized in identifying a display.

The DDC may also allow the dGPU to read Extended Display Identification Data (EDID) from the display device. The EDID may include information regarding the capabilities of the display device, letting the graphics card know what type of display device is connected. The EDID may include, for example, manufacturer name, product type, phosphor or filter type, timings supported by the display, display size, luminance data and pixel mapping data for digital displays.

In order to allow the detection and identification of a display device, even when the dGPU 122 is powered down, the graphics card 120 may include a parallel connection between the DDC 222 and the microcontroller 124. This parallel connection may allow the microcontroller 124 to monitor the DDC 222 (or any other type of display interface) for the presence of a display and/or report the type of display device to the motherboard, even while the graphics card is in a low power state with the dGPU 122 powered down.

The microcontroller 124 may cache the EDID and communicate the EDID to some type of logic (e.g., a resource manager-RM) of the chipset 114, with a parallel connection to the card bus 118. As will be described in greater detail below, the microcontroller may generate an interrupt to the motherboard upon detection of a display device. In addition, or as an alternative, to generating an interrupt the microcontroller may simply cache the EDID and wait to be polled by the chipset.

In any case, the chipset 114 may be able to detect the presence of the display and identify the display type, without having to wait for a relatively lengthy boot process that may be required to power on the dGPU 122 and exit the low power state. As described above, some display devices (e.g., devices with DVI or HDMI interfaces) may have connectors that provide a basic form of identification (or presence detection), for example, by connecting one or more pins (e.g., HPD pins) to ground. The microcontroller may be able to detect this simple form of detection. In addition, by polling the DDC to detect the presence of a display, the microcontroller may provide this basic form of identification, even for devices that do not support these types of connectors.

Figure 3:
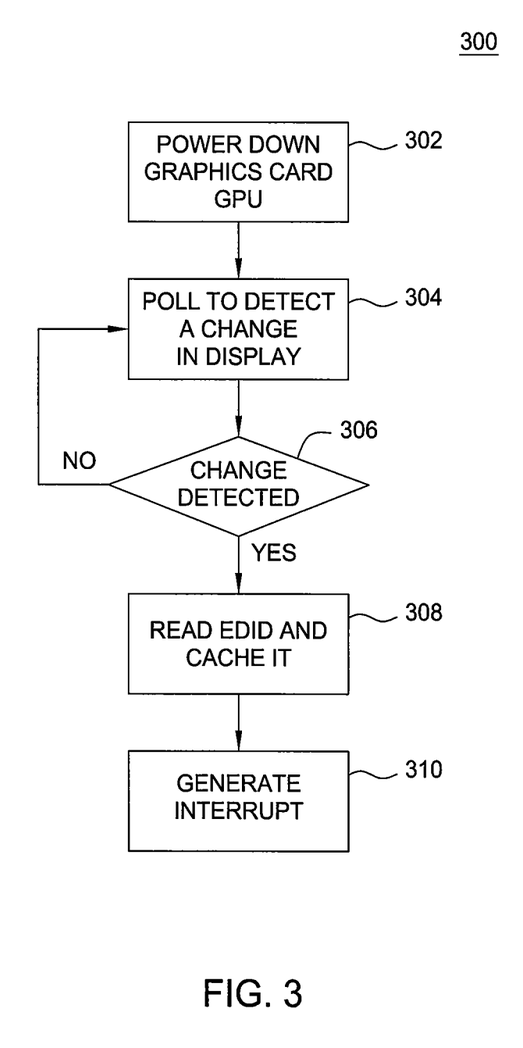
FIG. 3 is a flow diagram of example operations for identifying a display without powering on a GPU connected to the display in accordance with certain embodiments of the present disclosure.

FIG. 3 illustrates a flow diagram of example operations 300 that may be performed, for example, by the microcontroller 124, in order to identify a display device while a GPU connected to the device is powered down. The operations may allow the reading and reporting of the EDID while avoiding system delays that might be experienced if the dGPU had to be powered up to read the EDID.

The operations begin, at 302, by powering down a graphics card GPU. As previously described, for some embodiments, the microcontroller may help coordinate powering down the dGPU. For other embodiments, the dGPU may be power down without involvement by the microcontroller.

At 304, the display interface is polled to detect a change in the display. For example, the microcontroller may poll the DDC interface to detect the presence of a newly connected display device or the removal of a previously connected device. If a change in display is detected, at 306, the microcontroller may read the EDID and cache a copy of the EDID locally at 308. For some embodiments, the microcontroller may also generate an interrupt to the motherboard, at 310.

In response, the motherboard may take suitable action, for example, taking the graphics card out of a low power state in preparation of generating output for the newly detected display device. For some embodiments, the motherboard may include memory with drivers specific to the graphics card that helps enable some of the functionality discussed herein. For example, such drivers may include software instructions (executable code) that allow communication between the motherboard and graphics card, code to process an interrupt generated by the microcontroller, to poll the microcontroller to read the EDID, and the like.

For some embodiments, the microcontroller and/or the chipset may use the EDID information to detect a change of display state. For example, a currently read EDID may be compared against a previously read EDID to detect a change in display. If the microcontroller detects nothing (or gets an error) when there was an EDID read previously, a display may have been removed. If the microcontroller reads and EDID where there was no EDID read (or error encountered) before, a display may have been connected. If one or more parameters of the EDID (e.g., manufacturer, model number, serial number, etc.) has changed relative to a previous EDID, one display may have been swapped for another one. For some embodiments, to get a more robust indication of display status, an EDID may be read multiple times to confirm the display state change and counteract sporadic "read-errors." For some embodiments, these EDID-based operations may be performed at the microcontroller, for example, to confirm a change before generating an interrupt. For other embodiments, the operations may be performed at the chipset.

Figure 4A:
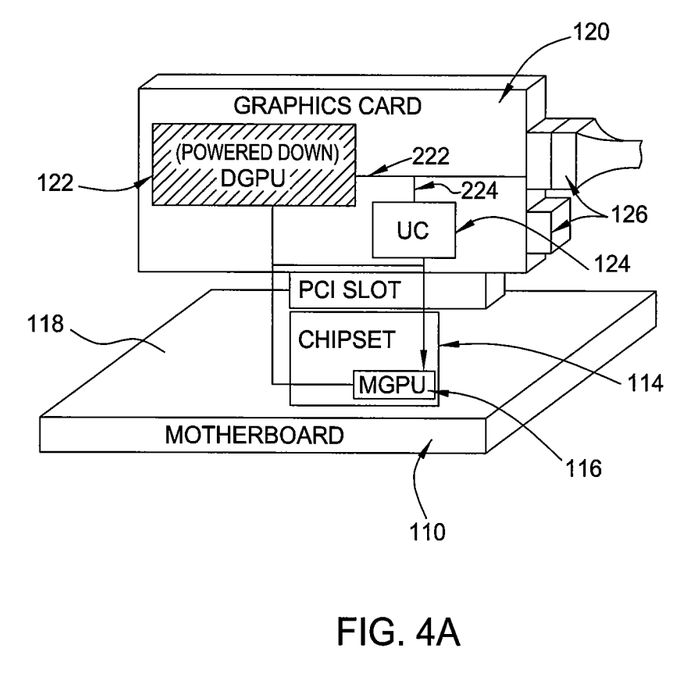
FIGS. 4A-4C illustrate states of a system when identifying a display in accordance with certain embodiments of the present disclosure.
Figure 4B:
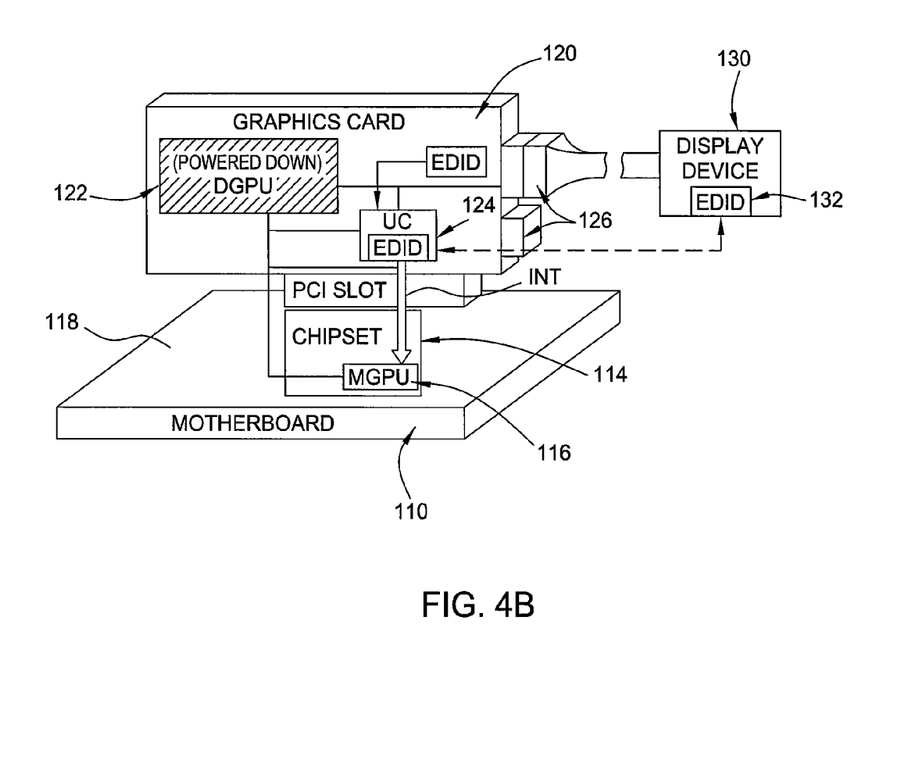
Figure 4C:
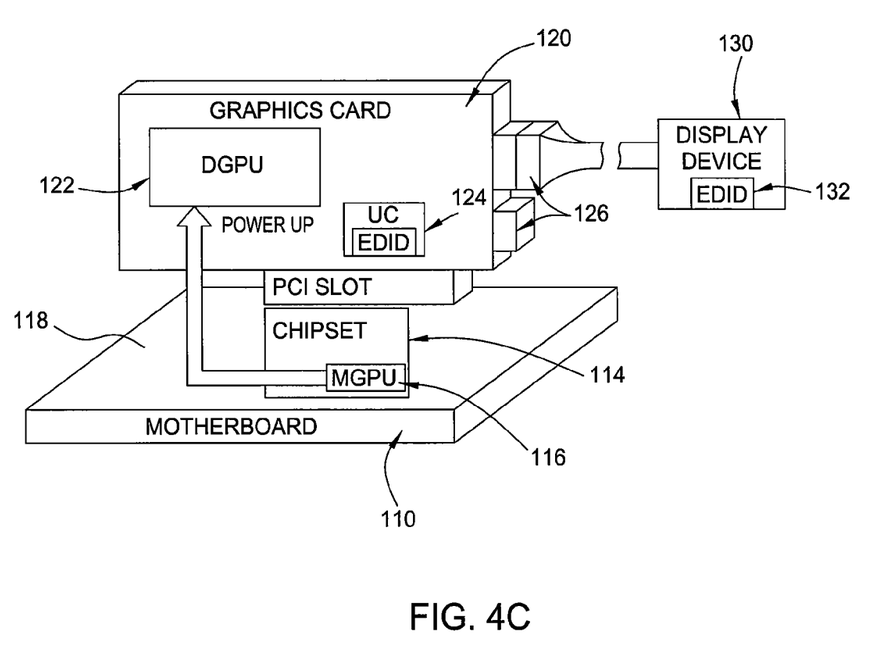

FIGS. 4A-4C illustrate the automatic detection of a newly connected display device, in accordance with certain embodiments. FIG. 4A depicts the graphics card in a low power state with the dGPU powered down. As illustrated, the microcontroller may send polling requests to the DDC, in an effort to detect a newly connected display device.

As illustrated in FIG. 4B, upon detecting the connection of a display device 130, the microcontroller may read the EDID 132 from the display device. For some embodiments, the microcontroller may keep a local (cache) copy of the EDID 132. For some embodiments, the microcontroller may read only a portion of the EDID upon detection of a display device. Remaining portions of the EDID may be read at the request of the motherboard or by the dGPU after it is powered up.

As illustrated, the microcontroller may also generate an interrupt to notify the motherboard a display device has been detected. The microcontroller may generate the interrupt using any suitable mechanism, for example, via the card bus 118 or via a dedicated interrupt signal line. As an alternative, the motherboard may poll the microcontroller to determine if a display has been detected.

In either case, in response to detecting a display device has been connected, the motherboard may prepare to output data to the display device. For example, as illustrated in FIG. 4C, the motherboard may take some type of action to exit the graphics card low power state and power on the dGPU. For some embodiments, the motherboard may signal the microcontroller to exit the graphics card low power state. In response, the microcontroller may help power on the dGPU and/or thermal solution, for example, by switching on one or more voltage regulators.

With the dGPU powered on, the motherboard may begin transferring scene data to the graphics card, in order to generate output to the newly connected display device. If the graphics card is placed in a low power state again, the operations described again may be repeated, as necessary.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for detecting a change in display device state, comprising:
  polling an interface to detect a change in a display device connected to the interface, wherein the polling is performed when a graphics processing unit (GPU) configured to poll the interface for the change in the display device is powered down; and
  upon detecting the change in the display device connected to the interface, notifying a motherboard on which the GPU is connected.

2. The method of claim 1, wherein polling the interface comprises polling a display data channel (DDC).

3. The method of claim 1, wherein polling the interface comprises polling a Hot Plug Detect signal.

4. The method of claim 1, wherein notifying the motherboard comprises generating an interrupt to a processor on the motherboard.

5. The method of claim 4, wherein generating an interrupt to a processor on the motherboard comprises generating an interrupt via a bus interface between the GPU and the motherboard.

6. The method of claim 1, further comprising:
  upon detecting the presence of a display device connected to the interface, reading display information from the display device.

7. The method of claim 6, wherein:
  reading display information from the display device comprises reading Extended Display Identification Data (EDID) from the display device;
  keeping a local copy of the EDID for reading by the motherboard; and
  transferring data from local copy of the EDID upon request from the motherboard.

8. The method of claim 1, comprising:
  comparing a previously read EDID value to a currently read EDID value to detect the change in the display device connected to the interface.

9. The method of claim 1, comprising:
  detecting removal of a display connected to the interface by failing to read an EDID value after having previously read an EDID value.

10. The method of claim 1, comprising:
  detecting arrival of a display connected to the interface by reading an EDID value after having previously failed to read an EDID value.

11. The method of claim 1, comprising:
reading an EDID multiple times to confirm the change in the display device connected to the interface prior to notifying the motherboard.

12. An apparatus for detecting a change in display device state, comprising:
an interface for communicating with a display device connected to the interface to detect a change in the display device connected; and
change detection logic for polling, via the interface, to detect the change in the display device when a graphics processing unit (GPU) configured to poll the interface for the change in the display device is powered down and for notifying a motherboard on which the GPU is connected upon detecting the change in the display device.

13. The apparatus of claim 12, wherein the change detection logic polls a display data channel (DDC) to detect the change in the display device.

14. The apparatus of claim 12, wherein the change detection logic polls the interface to detect a Hot Plug Detect signal.

15. The apparatus of claim 12, wherein the change detection logic notifies the motherboard by generating an interrupt to a processor on the motherboard.

16. The apparatus of claim 12, wherein the change detection logic, upon detecting the presence of a display device connected to the interface, reads Extended Display Identification Data (EDID) from the display device.

17. The apparatus of claim 16, wherein the change detection logic is configured to compare a previously read EDID value to a currently read EDID value to detect the change in the display device connected to the interface.

18. A graphics subsystem, comprising:
a graphics processing unit (GPU) capable of being dynamically placed in a low power state; and
change detection logic for polling an interface to detect a change in a display device connected to the interface when a portion of the GPU configured to poll the interface for the change in the display device is powered down and for notifying a motherboard on which the GPU is connected upon detecting the change in the display device.

19. The graphics subsystem of claim 18, wherein the change detection logic polls a display data channel (DDC) to detect the change in the display device.

20. The graphics subsystem of claim 19, wherein the change detection logic:
upon detecting the presence of a display device connected to the interface, reads Extended Display Identification Data (EDID) from the display device; and
compares a previously read EDID value to a currently read EDID value to detect the change in the display device connected to the interface.

* * * * *